L. KLINKER.
AUTOMOBILE THEFT SIGNAL.
APPLICATION FILED NOV. 13, 1919.
1,371,691.
Patented Mar. 15, 1921.
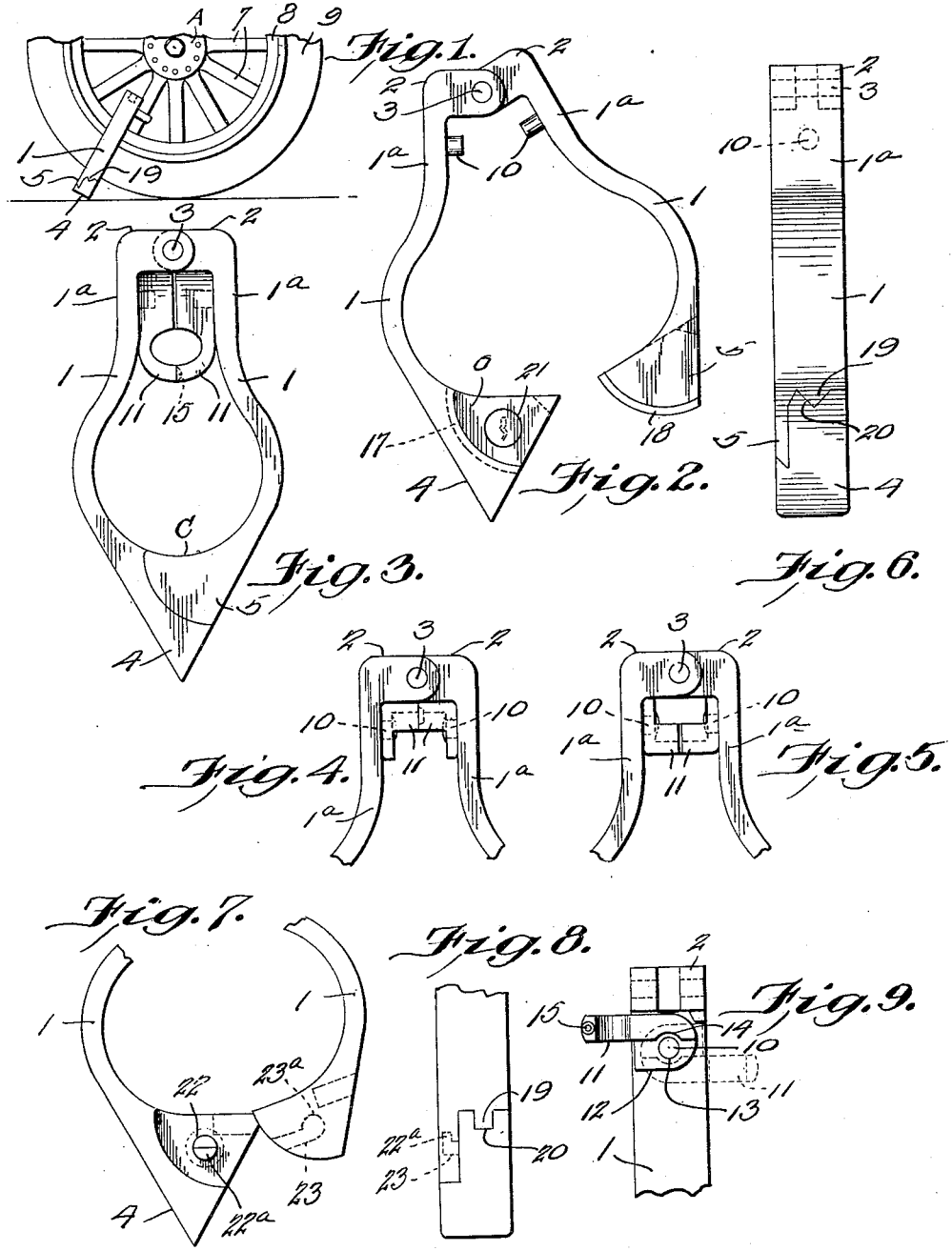

UNITED STATES PATENT OFFICE.

LAWRENCE KLINKER, OF SAN FRANCISCO, CALIFORNIA.

AUTOMOBILE THEFT-SIGNAL.

1,371,691. Specification of Letters Patent. Patented Mar. 15, 1921.

Application filed November 13, 1919. Serial No. 337,788.

*To all whom it may concern:*

Be it known that I, LAWRENCE KLINKER, a citizen of the United States, residing at San Francisco, in the county of San Francisco, State of California, have invented a new and useful Automobile Theft-Signal; and I do hereby declare the following to be a full, clear, and exact description of the invention, such as will enable others skilled in the art to which it appertains to make and use the same.

The present invention relates to an automobile theft signal of that general type which includes a shackle device adapted to be applied to the rim and tire of one of the wheels so that it is practically impossible for an unauthorized party to move the automobile or vehicle to which the theft signal is applied without attracting attention and making detection practically certain.

Among the objects of the invention are to provide a device of this character which is provided with means for positively engaging one of the wheel spokes so that the device can not be rotated into an inoperative position by the subterfuge of deflating the tire, and which embodies novel features of construction whereby it can be adjusted to fit different sizes of tires. This is a very important advantage, since it will reduce by one-half the stock which a dealer and manufacturer must carry at all times in order to supply the needs of customers having vehicles using the many different sizes of tires in common use. In this connection it will be remembered that it is necessary for these devices to fit the tire and rim closely so that it is impossible to rotate them into inoperative position, and with the ordinary construction now in quite extensive use a different size of theft signal is necessary for each size of tire. This makes it necessary for a dealer to carry a large supply of these devices in stock in order to meet the many requirements of his customers, and it will be understood that an adjustable device such as that of the present invention which will enable the same needs to be supplied with one-half of the stock will be a great advantage to both the manufacturer and dealer.

Further objects of the invention are to provide an automobile theft preventing device of this character which can be quickly placed in operative position or removed therefrom, which can not be moved or turned into an inoperative position by the subterfuge of deflating the tire, and which can be securely locked in position upon the tire without difficulty.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a fragmentary view of a wheel with a theft preventing device constructed in accordance with the invention applied thereto.

Fig. 2 is a side elevation of the theft preventing device with the pivotally connected shackle members swung into an open position and the spoke engaging arms removed.

Fig. 3 is an elevation of the theft preventing device with the shackle bars swung together and the spoke engaging arms swung into the plane of the shackle bars.

Fig. 4 is a detail view of the rim engaging end of the device with the spoke engaging arms swung into position in such a manner as to provide for engaging a large size of tire.

Fig. 5 is a similar view with the spoke engaging arms swung into position upon the opposite sides of the shackle bars and arranged so that the device will fit upon a smaller size of tire.

Fig. 6 is a side view of the device with the shackle bars in a closed position.

Figs. 7 and 8 are detail views showing a different form of lock for fastening the swinging ends of the shackle bars together.

Fig. 9 is a detail view of the inner face of the pivot end of one of the shackle bars, showing one position of the spoke engaging arm by full lines and the other position of the said spoke engaging arm by dotted lines.

Corresponding and like parts are referred to in the following description and indicated in all the views of the drawings by the same reference characters.

Referring to the drawings, which illustrate one possible embodiment of the invention, the numerals 1 designate a pair of complemental shackle bars which are adapted to fit upon opposite sides of the tire and wheel rim, the inner ends of the shackle bars being provided with inwardly extending lateral arms 2 which are pivotally connected at 3. It will also be observed that these inner ends of the shackle bars have substantially straight and parallel inner side portions 1ª which are adapted to fit against opposite sides of the wheel rim to assist in preventing possible rotation of the device upon the tire and wheel. The outer end of one of the shackle bars is provided with a pointed head or wing 4 which projects radially from the tread of the tire when the device is in operative position. The swinging or outer end of the other shackle bar is provided with a head 5 which fits within a recess 6 in one side of the wing 4 and is adapted to be secured thereto when the device is in operative position by some suitable lock such as that disclosed in Patent No. 1,311,404 which was granted to me on July 29, 1919. In Fig. 1 the device is shown as applied to an automobile wheel A, said wheel including the usual spokes 7 and felly 8, and a pneumatic tire 9 being fitted upon the felly. It will be observed that when the device is in operative position the pointed wing 4 projects radially from the tread of the tire so that it would initially act as a chock, to resist rotation of the wheel. While the vehicle might be moved if sufficient power were applied to the wheels, the radially projecting wing would be periodically brought into engagement with the rod at each rotation of the wheel and cause an irregular jumping motion of the vehicle which would attract the attention of any officer or observer and render detection practically certain. Furthermore, the wing would dig into the surface of the road at each revolution of the wheel, thereby causing the vehicle to leave a distinctive track which could be easily followed.

The shackle bars 1 are suitably curved to fit around the felly and tire of the wheel, and the portions 1ª of the said shackle bars are provided with inwardly projecting pivot studs 10 upon which a pair of complemental spoke engaging arms 11 are pivotally mounted, said arms being adapted to be swung upwardly into the plane of the shackle bars when the device is not in use, and to be swung outwardly so as to project upon either side of the shackle bars for engagement with one of the wheel spokes 7 when the device is in operative position. The pivot ends of the spoke engaging arms 11 are of such a width as to be brought substantially into engagement with each other when the device is in a locked position, and the outer sides of these spoke engaging arms are provided with flanges 12 which have openings 13 therein to receive the pivot studs 10. The ends of the pivot studs 10 may be flattened or upset after they have been inserted through the openings 13 so as to hold the arms 11 in position, and the flat faces of the pivot ends of the arms are formed with transverse grooves 14 which are in alinement with the openings 13 and may provide a clearance space for the studs 10 when the latter are inserted in position. The free ends of the spoke engaging arms 11 are curved so as to fit around and embrace one of the wheel spokes, and the extremity of one of the arms terminates in a finger 15 which is adapted to fit in a corresponding recess in the other arm, thereby locking the two arms together when the device is fitted upon a tire in operative position.

It will be observed that the pivot studs 10 are located at the central portion of the inner faces of the shackle bars and that they have an eccentric connection with the spoke engaging arms. Owing to this eccentric pivotal connection of the spoke engaging arms with the shackle bars, the distance between the said spoke engaging arms and the crown C of the device, the crown being that portion of the device which fits upon the tread of the tire, is greater when the spoke engaging arms are swung outwardly on one side of the device than when the said arms are swung outwardly on the other side of the device. This enables the same locking device to be used in connection with two different sizes of tires. When the spoke engaging arms are swung laterally in such a direction as to provide the larger space between the crown of the device and the spoke engaging arms the device will fit a larger size of tire than when the spoke engaging arms are swung outwardly in the opposite direction. The position of the arms when the device is to be used on a larger size of tire, is indicated by Fig. 4, while the position of the arms when the device is to be used on a smaller size of tire is indicated by Fig. 5. As previously stated, this is a very great advantage, since it decreases by one-half the size of the stock which a dealer must carry to meet the demands of his customers who may have all of the many different sizes of tires which are in common use.

The recess 6 in the side of the pointed wing 4 has undercut edge portions 17 which receive the beveled edges 18 of the head 5 and coöperate therewith to prevent the head from being separated laterally from the wing when the device is in locked position. As an additional safeguard against this possible lateral separation of the head from the wing, the shoulder 17 provided at the end of the shackle bar and adjacent the base of the head may be formed with a lug 19 which is adapted to enter a corresponding notch or recess 20 in the end of the wing 4. This lug coöperates with the beveled edges 18 of the head to lock the head against lateral separation from the pointed wing 4. This pointed wing may be provided with a key-controlled sliding lock bolt 21, such as that disclosed in Patent No. 1,311,404 which was granted to me on July 29, 1919, for locking the two shackle bars in a closed position after they have been fitted around the felly and tire of a vehicle wheel and swung into a closed position.

A slightly modified form of lock is shown by Fig. 7, in which a rotary locking bolt 22 is journaled in the wing 4, any suitable means being adapted to be used whereby the rotation of this locking bolt is controlled by a key. The end of the locking bolt has one-half thereof cut away to leave an offset lug $22^a$ which is semicircular in cross section. The head 5 of the other shackle bar is provided upon the inner face thereof with a groove 23 which is adapted to receive the lug $22^a$ at one position of the locking bolt. After the head 5 has been moved into a locking position the locking bolt 22 is adapted to be rotated to swing the lug $22^a$ into an elbow portion $23^a$ at the inner end of the groove 23. The head is thereby locked in position against the pointed wing 4 so that it is impossible to swing the shackle bars apart until the locking bolt 22 has been rotated to bring the lug $22^a$ back to its original position. It will be understood that when the device is not in use the spoke engaging arms 11 are folded into the plane of the shackle bars, although when the device is applied to a tire these spoke engaging arms are swung laterally so that they will fit around and interlock with one of the spokes of the wheel, as indicated by Fig. 1. When applying the device to the larger size of tire these arms are swung outwardly in one direction, while when applying the device to a smaller size of tire the arms are swung outwardly in the other direction. These spoke engaging arms constitute an additional safe guard and make it impossible to rotate the device in such a manner as to bring the pointed wing 4 into inoperative position, even by the subterfuge of deflating the tire.

Having thus described the invention, what I claim as new and desire to secure by Letters Patent, is:—

1. A theft preventing device for automobiles including complemental shackle bars which are adapted to embrace the rim and tire of a wheel, and a member adjustably mounted within the shackle bars and adapted to be set in different positions to vary the effective distance between the rim engaging end of the device and the tread engaging end of the device for enabling the device to be fitted upon different sizes of tires, said member having faces engaging the wheel to hold it in an adjusted position when the device is operatively applied.

2. A theft preventing device for automobiles including complemental shackle bars which are adapted to embrace the rim and tire of a wheel, and a member pivotally mounted within the shackle bars and adjustable into different positions for varying the effective distance between the rim engaging end of the device and the tread engaging end of the device to enable the device to be fitted upon different sizes of tires, said pivoted member being formed with faces which are adapted to be engaged by the wheel to hold the member in an adjusted position when the device is operatively applied.

3. A theft preventing device for automobiles, including complemental shackle bars which are adapted to embrace the rim and tire of a wheel, and a reversible eccentrically mounted member carried by the shackle bars and adapted when swung in opposite directions to vary the effective distance between the rim engaging end of the device and the tread engaging end of the device to enable the device to be fitted upon different sizes of tires, said member being engaged by the wheel to lock it in an adjusted position when the device is operatively applied.

4. A theft preventing device for automobiles, including complemental shackle bars which are adapted to embrace the rim and tire of a wheel, a wing carried by the shackle bars at the tread engaging end of the device, and a spoke enaging member reversibly mounted upon the rim engaging end of the device and arranged to vary the distance between the tread engaging end of the device and the rim engaging end of the device to enable the device to be fitted upon different sizes of tires.

5. A theft preventing device for automobiles, including complemental shackle bars which are adapted to embrace the rim and tire of a wheel, a wing carried by the shackle bars at the tread engaging end of the device, and an eccentrically mounted reversible spoke engaging arm pivotally mounted upon the rim engaging end of the device and adapted to be swung outwardly upon opposite sides of the shackle bars, the eccentric mounting of the spoke engaging member causing the effective distance between the rim engaging end of the device and the tread engaging end of the device to be greater when the spoke engaging device is in one position than in the other position, thereby enabling the device to be adjusted for engagement with different sizes of tires.

6. A theft preventing device for automobiles, including complemental shackle bars which are adapted to embrace the rim and tire of a wheel, and a spoke engaging member adjustably mounted upon the rim engaging member of the device, and arranged to be set in different positions to vary the distance between the tread engaging end of the device and the rim engaging end of the device and enable the device to be fitted upon different sizes of tires, said spoke engaging device being automatically locked in an adjusted position by engagement with the wheel when the device is operatively applied thereto.

In testimony whereof I have signed my name to this specification in the presence of two subscribing witnesses.

LAWRENCE KLINKER.

Witnesses:
 NED SMITH,
 HUGH EASTMAN.